Jan. 8, 1963  H. F. H. SCHEIDING  3,071,801
FISH WASHING MACHINE
Filed July 18, 1960  2 Sheets-Sheet 1

INVENTOR:
HORST FRIEDRICH HEINRICH SCHEIDING
BY Kenwood Ross
ATTORNEY.

Jan. 8, 1963 H. F. H. SCHEIDING 3,071,801
FISH WASHING MACHINE
Filed July 18, 1960 2 Sheets-Sheet 2

INVENTOR:
HORST FRIEDRICH HEINRICH SCHEIDING
BY *Kenwood Ross*
ATTORNEY.

United States Patent Office 3,071,801
Patented Jan. 8, 1963

3,071,801
FISH WASHING MACHINE
Horst Friedrich Heinrich Scheiding, 4A Duringerstrasse, Loxstedt, Bremerhaven, Germany
Filed July 18, 1960, Ser. No. 43,423
1 Claim. (Cl. 17—6)

This invention concerns machines for washing fish.

Fish, caught by steam trawlers, are shaken out of the tail of the net, and, depending on the kind of fish, are cut up or left whole, and are then thrown into a washing tank situated on deck. Dirt of all kinds adheres to the fish, such as for example, pieces of fish-gut or the residues of sea plants and creatures frequently in a decayed or rotted condition.

These dirt substances are not only unpleasant but have the disadvantage that they are very unhygienic, since they constitue concentrated and active or spreading sources of decay and decomposition bacteria which uncontrollably infect the healthy and fresh fish. The freshness of the catch, its keeping properties, and its commercial value are thus greatly affected.

Attempts have been made to clean the fish by using a deck washing pipeline to direct a jet of water on to the fish in the washing tank. In carrying out this operation, members of the crew tread over the fish with their sea boots in order to move the mass of fish, in the hope that water will be supplied to the bottommost fish as a result of the motion imparted to the mass.

In this way, however, it is not possible adequately to wash away the dirt lodged between the fish to clean the open belly cavities of fish that have been cut up, because the fish are not turned over individually and rather accumulate in cohesive groups. The washing water cannot get sufficiently near to the dirt. Moreover, there is a further deterioration in quality due to the fact that the fish situated at the top of the mass are mechanically damaged by the sea-boots.

A fish scale removing machine is also already known which comprises a continuously rotating drum which is mounted at an angle and the ends of which are open and the walls of which are perforated, and a fixed seawater pipe provided with spraying nozzles extending through said drum. Beneath the drum, a trough is provided to collect the dirty water emerging from the drum wall holes, at a distance such that the drum does not dip into the dirty water in the trough. With this known machine, the drum wall comprises a grating-like network which is provided with inwardly projecting sharp edges in order to tear off the scales of the fish. However, this is equivalent to damaging the body of the fish and such damage constitutes a point of entry for decay bacteria, so that the fish treated in this machine cannot be kept fresh during a long journey from a fishing ground to an unloading port.

In another known fish washing machine, in which a drum consisting of strips of wood is immersed to substantially half in the water of the trough situated beneath it, brush strips disposed helically on the inside of the drum serve for cleaning, de-scaling and moving the fish, forwardly through the drum. In this machine, as well, the fish are damaged on their surfaces and, moreover, are in contact with dirty water during the entire passage through the washing drum and this also has a disadvantageous effect on the keeping properties of the fish.

The object of the present invention is to obviate these disadvantages and equip a washing machine with a rotating drum and a fixed sea-water pipe extending therethrough in such manner that the fish are cleaned efficiently therein and are at the same time treated non-injuriously so that not only the scales but, as far as possible, the mucus film thereover is maintained unharmed. The new washing machine is chacterised in that a feed screw and turn-over strips disposed on the inside of the drum wall have a cross-section which is rounded off after the style of a beading and consist of a soft elastic material, such as rubber or plastics, and further that the holes or slots in the drum wall are provided in small numbers in the front and middle region of the drum and in large numbers in the rear region of the drum.

Although completely turned over and thoroughly cleaned in the drum equipped in this manner, the fish do not come into contact with any hard or sharp edges which might damage same. Moreover, the arrangement of the small number of holes or slots in the front and middle part of the drum wall, in conjunction with the feed screw, has the effect that the water emerging from nozzles of the seawater pipeline does not immediately run completely out of the drum but dams up at the turns of the feed screw so that dry frictional engagement of the fish against the drum wall is prevented over the greater part of the length of the drum and thus damage to the fish is reliably avoided. The complete discharge of the sprayed water is only effected in the rear part of the drum, in which there are a large number of draining holes. This part of the drum may, however, be so short that no damage to the fish occurs here.

The invention will be described further, by way of example, with reference to the accompanying drawings in which.

Figure 1:
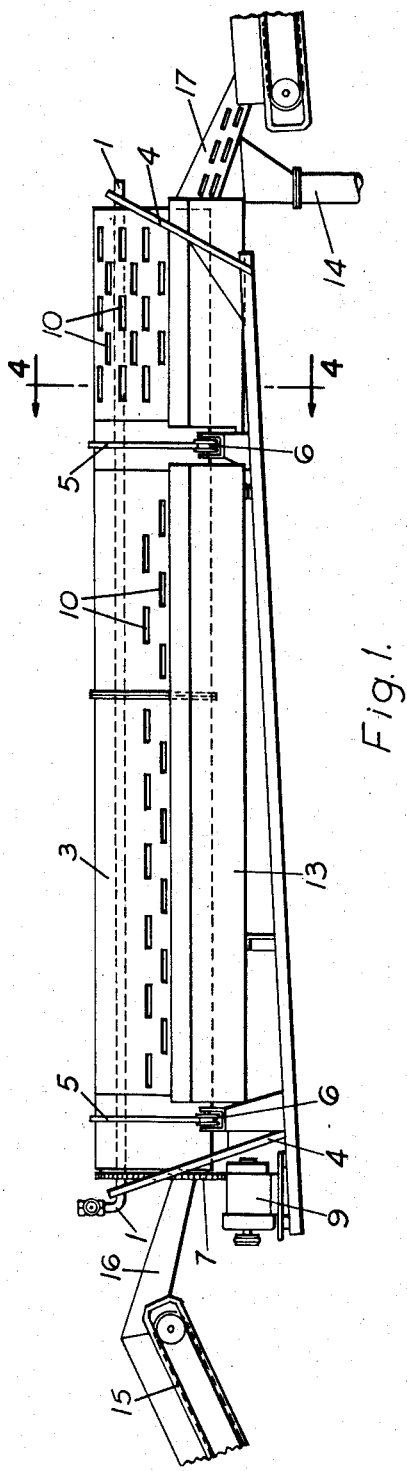
FIG. 1 is a side elevational view of a preferred embodiment of a spraying machine according to the invention.

The fish washing machine illustrated comprises a pipe 1 which is provided with spraying nozzles 2 and which is connected at one end to a seawater pipeline (not shown) and is closed at the opposite or right-hand end (FIG. 1). This pipe extends through an inclined drum 3, the ends of which are open, and is fastened at both ends of the drum on brackets 4 (FIG. 1) which are disposed on a bed of the machine. The drum 3 is reinforced with annular rails 5 which run on rollers 6. If necessary, further rollers and securing straps (not shown) may be provided to engage the annular rails 5 to prevent the drum 3 from lifting off the rollers 6 as a result of waves sweeping over the ship or intensive rolling of the ship.

Figure 2:
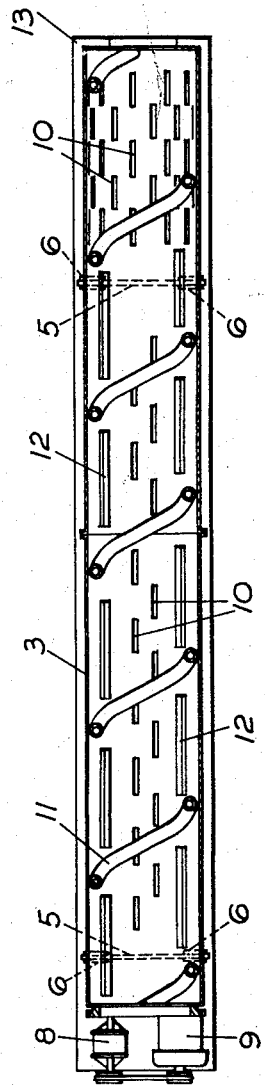
FIG. 2 is a sectional view, taken on the longitudinal axis of the drum of the spraying machine shown in FIG. 1.
Figure 3:
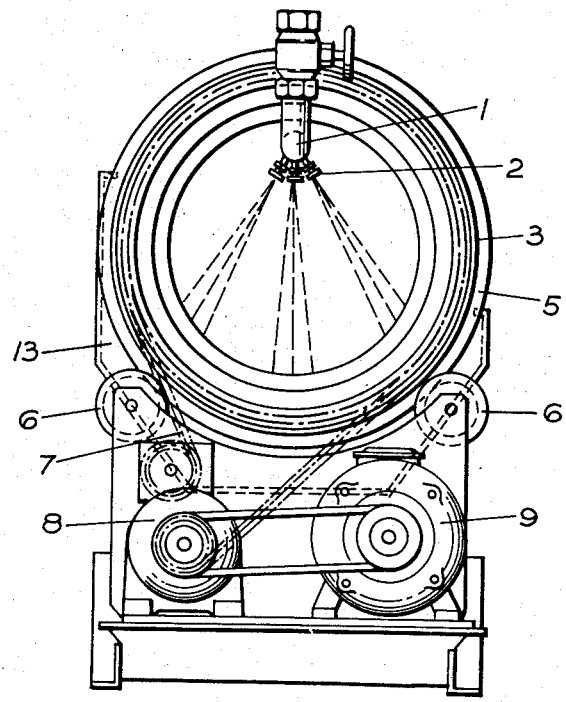
FIG. 3 is an end view, on an enlarged scale, taken in the direction of the drum axis.
Figure 4:
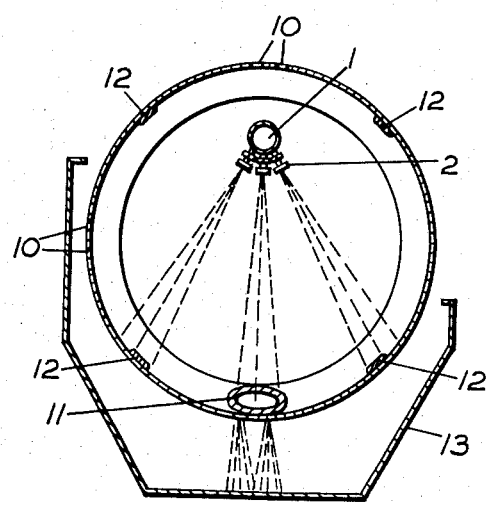
FIG. 4 is an enlarged cross-sectional view through the drum and trough taken substantially on the line 4—4 of FIG. 1.

The drum 3 rotates and is driven by a chain 7 from a reduction gear 8 which in turn is driven by an electric motor 9. The drum wall is provided with holes or slots 10 which, as shown in FIGS. 1 and 2, are provided in small numbers in the front or upper end and middle part of the drum 3 and in large numbers at the rear or lower end of the drum 3.

A rubber hose 11 or a rubber hollow profile is fastened helically onto the inner wall of the drum 3 and serves as a feed screw. Beneath the drum 3, a trough 13 is disposed on the machine bed and serves to collect dirty water running out of the drum 3 through the slots 10. A pipe 14 takes the dirty water overboard.

Fish to be washed are continuously supplied to the rotating drum 3, for example, by means of an endless conveyor band 15 and a chute 16. The hose 11, serving as a feed screw, transports the fish along the inside of the drum 3. In these circumstances, the fish are continually turned over, not only by the rotary movement of the drum 3, but also by the hose 11 so that the jets of sea water emerging in different directions from the spraying nozzles 2 wash the fish from all directions and, if the fish have been cut up beforehand, these jets of water also penetrate into the open belly cavities. The turning over of the fish is assisted by means of strips 12 provided on the inside of the drum wall. These strips 12 are rounded after the style of a beading and consist of a soft elastic material, for example rubber or plastics.

The trough 13 is disposed beneath the drum 3 at a level such that the latter cannot dip into the dirty water in the trough 13. The fish can therefore, come into contact only with fresh sea water.

It is advisable to discontinue the spraying nozzles 2 just in front of the right-hand end of the drum 3 so that the water can drip off the fish while still in the drum 3. Further dripping off of the water from the cleaned fish being discharged from the drum 3 takes place on an adjoining draining and discharge chute 17.

The washing machine described not only has the advantage that the fish are thoroughly and reliably cleaned from all directions, even in their open belly cavities, but also that this cleaning is carried out entirely without any damage to the bodies of the fish so that the fish bodies are extensively protected from infection due to decay bacteria. The value of the catch is thus safeguarded.

Numerous structural modifications can, of course be made to the described example. For instance, it may be advantageous for the operation of the machine if the ordinary reduction gear 8 is replaced by an infinitely variable gear and if the spraying nozzles 2 are adapted to be put out of operation in groups. Additional pipes may be provided in parallel relationship to the pipe for carrying the sea water in order to supply a liquid preservative. Fans may also be provided to circulate the air in order to dry the catch more rapidly.

I claim:

In a fish washing machine, a horizontally-disposed bed, an open-ended drum mounted upwardly of and at an angle relative to said bed and having a plurality of apertures extending through the wall thereof, the apertures in said drum being in small number over the periphery of the upper and middle portions and in larger number over the periphery of the lower portion of said drum, a helically-arranged flexible tube-like bead-like fish feeding and turning strip secured to the inner surface of said drum, means for rotating said drum, a stationary water pipe supported upwardly of said bed and extending longitudinally through said drum, a plurality of spraying nozzles disposed at spaced intervals along and extending downwardly from said water pipe, a water collecting trough supported upwardly of and at an incline relative to said bed and disposed in a plane substantially parallel to and sufficiently below said drum for the level of the water collected in said trough as discharged from said drum to be below said drum.

References Cited in the file of this patent

UNITED STATES PATENTS

| | | |
|---|---|---|
| 1,383,162 | Sprague | June 28, 1921 |
| 1,779,046 | McNaney | Oct. 21, 1930 |
| 2,062,946 | Sorensen | Dec. 1, 1936 |
| 2,652,588 | Harris | Sept. 22, 1953 |

FOREIGN PATENTS

| | | |
|---|---|---|
| 571,720 | France | Feb. 7, 1924 |